Patented Mar. 15, 1932

1,849,082

UNITED STATES PATENT OFFICE

CARL EYER, OF LUDWIGSHAFEN-ON-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF SOLID CALCIUM NITRATE

No Drawing. Application filed November 20, 1925, Serial No. 70,407, and in Germany December 4, 1924.

It is well known that in the manufacture of calcium nitrate in a solid form great difficulties are encountered.

I have now found that calcium nitrate can be easily produced in a solid form and practically free from water, that is, practically anhydrous by bringing a highly concentrated solution thereof, which is preferably evaporated as far as possible, onto heated surfaces, for example the surfaces of rollers, drums or the like which are heated sufficiently to evaporate the rest of the water. Dry practically anhydrous calcium nitrate which can be constantly removed from the said surfaces by suitable scrapers or the like is thus formed. The salt is obtained in a granular form without any considerable formation of dust and is well suited for use as a fertilizer. A temperature of between about 200 degrees and 250 degrees centigrade is most suitable for the evaporation and may be produced by means of superheated steam or by the combustion of gases inside the rollers, drums, or the like, or by any other usual method. The calcium nitrate prepared in this manner is practically free from water, in which state it is distinguished by a high percentage of nitrogen, say about 16.5 to 17 per cent. The calcium nitrate solution may contain additional substances, if desired.

I claim:

The process of producing readily spreadable solid calcium nitrate which is practically anhydrous and contains about 16.5 to 17 per cent of nitrogen, which comprises evaporating a concentrated calcium nitrate solution on and by means of a rotating surface heated to about from 200 to 250° C., and removing the dry salt from said surface.

In testimony whereof I have hereunto set my hand.

CARL EYER.